US011794715B2

(12) United States Patent
Bolger et al.

(10) Patent No.: US 11,794,715 B2
(45) Date of Patent: Oct. 24, 2023

(54) BRAKE ASSIST DURING VEHICLE ONE PEDAL DRIVE

(71) Applicant: Ford Global Technologies, LLC, Dearborn, MI (US)

(72) Inventors: Bryan Michael Bolger, Canton, MI (US); Sergey Gennadievich Semenov, Farmington Hills, MI (US); Joshua Hoop, Plymouth, MI (US); Devin James O'Donnell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 17/035,481

(22) Filed: Sep. 28, 2020

(65) Prior Publication Data
US 2022/0097671 A1    Mar. 31, 2022

(51) Int. Cl.
*B60W 10/04* (2006.01)
*B60W 10/184* (2012.01)
*B60W 10/196* (2012.01)

(52) U.S. Cl.
CPC .......... *B60W 10/184* (2013.01); *B60W 10/04* (2013.01); *B60W 10/196* (2013.01); *B60W 2510/087* (2013.01); *B60W 2510/18* (2013.01); *B60W 2520/10* (2013.01)

(58) Field of Classification Search
CPC .......... B60L 7/18; B60L 7/26; B60L 2240/12; B60L 2250/26; B60L 2260/24; B60L 15/2009; B60W 10/04; B60W 10/184; B60W 10/196; B60W 2510/087; B60W 2510/18; B60W 2520/10; B60W 10/18; B60T 8/17; B60T 8/32; B60T 8/86
USPC .......................................................... 701/79
See application file for complete search history.

(56) References Cited

U.S. PATENT DOCUMENTS

| | | | |
|---|---|---|---|
| 8,437,937 B2 | 5/2013 | Ganley et al. | |
| 8,932,179 B2 | 1/2015 | Banker et al. | |
| 10,005,363 B1 * | 6/2018 | Correia | B60L 3/12 |
| 10,647,205 B2 * | 5/2020 | Kaneko | B60L 7/18 |
| 2002/0082754 A1 * | 6/2002 | Robichaux | B60W 50/16 |
| | | | 180/65.285 |
| 2003/0004635 A1 * | 1/2003 | Kamiya | F02N 11/0837 |
| | | | 477/203 |

(Continued)

FOREIGN PATENT DOCUMENTS

| | | | | |
|---|---|---|---|---|
| CN | 104773156 A | * | 7/2015 | .......... B60W 10/023 |
| CN | 106064627 A | * | 11/2016 | .......... B60L 15/2063 |

(Continued)

*Primary Examiner* — B M M Hannan
(74) *Attorney, Agent, or Firm* — David B. Kelley; Brooks Kushman P.C.

(57) ABSTRACT

Responsive to accelerator pedal release and a speed of a vehicle being less than a threshold in a presence of indication that available powertrain torque has been reduced for at least a predetermined period of time during an absence of brake pedal engagement, a controller operates friction brakes to bring the vehicle to a stop. Responsive to accelerator pedal release and the speed being less than the threshold in an absence of the indication that available powertrain torque has been reduced and brake pedal engagement, the controller operates an electric machine and not the friction brakes to bring the vehicle to a stop.

6 Claims, 3 Drawing Sheets

(56) References Cited

U.S. PATENT DOCUMENTS

| | | | | |
|---|---|---|---|---|
| 2003/0184152 | A1* | 10/2003 | Cikanek | B60W 30/18127 903/946 |
| 2013/0289809 | A1* | 10/2013 | Treharne | B60L 3/0046 180/65.285 |
| 2013/0296130 | A1* | 11/2013 | Banker | B60L 7/26 477/209 |
| 2013/0304336 | A1* | 11/2013 | Jackson | B60W 10/115 477/92 |
| 2014/0297165 | A1* | 10/2014 | Matsunaga | B60W 30/18018 701/112 |
| 2015/0073675 | A1* | 3/2015 | Malone | B60W 30/18018 477/185 |
| 2015/0202964 | A1* | 7/2015 | Nefcy | B60W 10/08 701/70 |
| 2018/0134276 | A1* | 5/2018 | Zhao | B60L 58/12 |
| 2018/0154777 | A1* | 6/2018 | Hall | B60L 7/18 |
| 2018/0154797 | A1* | 6/2018 | Sawada | B60L 15/2009 |
| 2018/0261024 | A1* | 9/2018 | Books | G07C 5/0841 |
| 2018/0297475 | A1* | 10/2018 | Zhao | B60T 8/172 |
| 2019/0337397 | A1* | 11/2019 | Park | B60L 15/08 |
| 2020/0023817 | A1* | 1/2020 | O'Meachair | B60L 15/2009 |
| 2020/0079219 | A1* | 3/2020 | Okubo | B60L 7/26 |
| 2020/0165987 | A1* | 5/2020 | Cunningham | B60W 20/00 |
| 2020/0189556 | A1* | 6/2020 | Burt | B60T 17/22 |
| 2020/0331455 | A1* | 10/2020 | Meyer | B60K 6/52 |
| 2020/0398844 | A1* | 12/2020 | Ruybal | B60W 10/119 |
| 2021/0053448 | A1* | 2/2021 | Beck | B60W 50/00 |
| 2021/0078574 | A1* | 3/2021 | Takaso | B60W 30/143 |
| 2021/0086736 | A1* | 3/2021 | Yao | B60T 1/10 |
| 2021/0171022 | A1* | 6/2021 | Tsuchiya | B60W 30/09 |
| 2021/0252983 | A1* | 8/2021 | Nahrwold | B60L 58/12 |
| 2022/0080971 | A1* | 3/2022 | Bolger | B60W 30/182 |

FOREIGN PATENT DOCUMENTS

| | | | | |
|---|---|---|---|---|
| CN | 106274881 A | * | 1/2017 | B60K 6/36 |
| DE | 19622017 A1 | | 12/1996 | |
| DE | 102010045021 A1 | * | 3/2011 | B60T 13/662 |
| DE | 102014222643 A1 | * | 5/2015 | B60K 6/387 |
| DE | 102014222650 A1 | * | 5/2015 | B60K 6/387 |
| DE | 102015121094 A1 | * | 6/2016 | B60K 6/48 |
| DE | 102015225477 A1 | * | 3/2017 | B60K 6/48 |
| DE | 102016121669 A1 | * | 5/2017 | B60K 6/26 |
| EP | 2055580 A2 | | 5/2009 | B60K 6/365 |
| WO | WO-2019190389 A1 | * | 10/2019 | B60L 15/20 |

* cited by examiner

BRAKE ASSIST DURING VEHICLE ONE PEDAL DRIVE

TECHNICAL FIELD

This disclosure relates to control of a vehicle during one pedal driving.

BACKGROUND

The powertrain of a vehicle with an electric generator/motor may consume energy to propel the vehicle forward and generate energy to slow or stop the vehicle. This regenerative braking captures kinetic energy associated with movement of the vehicle and transforms it into electrical energy for storage in a battery.

In one pedal driving mode, a driver may not need to press the brake pedal to slow the vehicle or bring the vehicle to a stop. Just as pressing the accelerator pedal may cause the motor to propel the vehicle forward, releasing the accelerator pedal may cause the generator to regeneratively brake the vehicle—without use of the friction brakes.

SUMMARY

A vehicle includes an electric machine, friction brakes, and a controller. The controller, responsive to accelerator pedal release and a speed of the vehicle being less than a threshold in a presence of automatic operation of the friction brakes for at least a predetermined period of time absent brake pedal engagement, operates at least the friction brakes to bring the vehicle to a stop. The controller further, responsive to accelerator pedal release and the speed being less than the threshold in an absence of automatic operation of the friction brakes and brake pedal engagement, operates the electric machine and not the friction brakes to bring the vehicle to a stop.

A method for controlling a vehicle includes, responsive to accelerator pedal release and a speed of the vehicle being less than a threshold in a presence of indication that available powertrain torque has been reduced for at least a predetermined period of time during an absence of brake pedal engagement, operating friction brakes to bring the vehicle to a stop. The predetermined period of time depends on a cause of the indication that available powertrain torque has been reduced such that the predetermined period of time is different for different causes of the indication. The method also includes, responsive to accelerator pedal release and the speed being less than the threshold in an absence of the indication that available powertrain torque has been reduced and brake pedal engagement, operating an electric machine and not the friction brakes to bring the vehicle to a stop.

A vehicle includes an electric machine, friction brakes, and a controller. The controller, responsive to a speed of the vehicle being less than a threshold, accelerator pedal release, an absence of indication that available powertrain torque has been reduced, an absence of brake pedal engagement, and a presence of indication that available powertrain stopping torque has been limited, operates the friction brakes to bring the vehicle to a stop. The controller also, responsive to the speed being less than the threshold, accelerator pedal release, the absence of indication that available powertrain torque has been reduced, the absence of brake pedal engagement, and an absence of the indication that available powertrain stopping torque has been limited, operates the electric machine and not the friction brakes to bring the vehicle to a stop.

DETAILED DESCRIPTION

Figure 1:
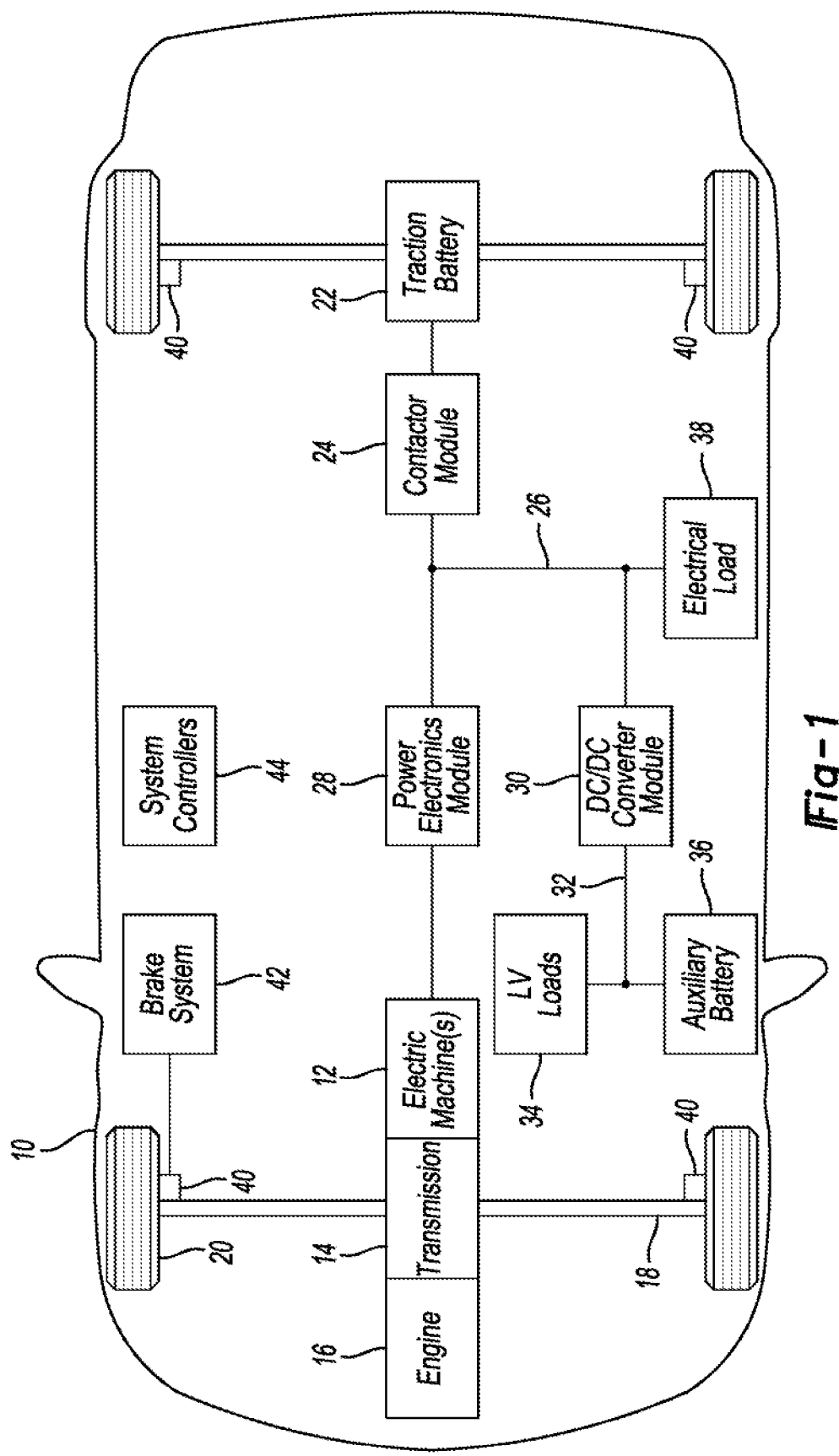
FIG. 1 is a schematic diagram of a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One pedal drive may give more control to the accelerator pedal with increased lift pedal regenerative braking and the ability to bring the vehicle to a stop without input from the brake pedal on a range of grades. It may be enabled responsive to driver input, such as a button press or speed being less than some threshold.

A one pedal drive low speed controller may control the vehicle to a complete stop from low speeds via powertrain torque modification when the vehicle is in one pedal drive mode and the customer has tipped out of the accelerator pedal. Although the primary mode of operation is to command the vehicle to a stop using powertrain torque, there may be situations in which the low speed controller may not bring the vehicle to a stop without support from friction brakes. Powertrain charge limits and motor limitations for example can keep the powertrain from being able to command the required decelerative powertrain torque.

There may also be conditions in which a brake control module commanding friction brake torque is more suited to control the vehicle to a stop. There may be a need to arbitrate one pedal drive low speed controller operations and brake control module operations during events such as anti-lock braking, brake drag control, and traction control, which can involve automatic activation of friction brakes and/or a reduction in available powertrain torque (available positive torque or available negative torque as the case may be) in an absence of driver brake pedal input, to obtain consistency with low vehicle speed tip-outs. As such, the one pedal drive low speed controller may send a request to the brake control module to control the vehicle to a stop using friction brakes for the following example reasons: powertrain charge limits prohibit the low speed controller from commanding powertrain torque to bring the vehicle to a complete stop; motor limitations prohibit the low speed controller from commanding powertrain torque to bring the vehicle to a complete stop; a brake drag control event is being performed by the brake control module; an anti-lock brake event is being performed by the brake control module; a traction control event is being performed by the brake control module; or the driver fully tips out of the accelerator pedal at some calibratable low speed.

The low speed controller may evaluate each of the above reasons for some calibratable time that depends on the reason to confirm its validity. For a valid reason, the brake request may be sent when vehicle speed is below a calibratable threshold that also depends on the reason. The speed condition ensures that the request is not be rejected by the brake control module. Upon receiving this request, the brake control module may target zero vehicle speed and control the vehicle to stop while arbitrating the request with any existing drag control, anti-lock braking, or traction control events, etc.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shaft 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. A contactor module 24 may include one or more contactors configured to isolate the traction battery 22 from a high voltage bus 26 when opened and connect the traction battery 22 to the high voltage bus 26 when closed. The high voltage bus 26 may include power and return conductors for carrying current. One or more power electronics modules 28 (e.g., inverters) may be electrically coupled to the high voltage bus 26. The power electronics modules 28 are also electrically coupled to the electric machines 12 and provide the ability to bi-directionally transfer energy between the traction battery 22 and the electric machines 12. For example, the traction battery 22 may provide a DC voltage while the electric machines 12 may operate with a three phase alternating current (AC) to function. The power electronics module 28 may convert the DC voltage to three phase AC current to operate the electric machines 12. In regenerative mode, the power electronics module 28 may convert the three phase AC current from the electric machines 12 acting as generators to DC voltage compatible with the traction battery 22.

In addition to providing energy for propulsion, the traction battery 22 may provide energy for other vehicle electrical systems. The vehicle 10 may include a DC/DC converter module 30 that converts the high voltage DC output from the high voltage bus 26 to a low voltage DC level of a low voltage bus 32 that is compatible with low voltage loads 34. An output of the DC/DC converter module 30 may be electrically coupled to an auxiliary battery 36 (e.g., 12V battery) for charging the auxiliary battery 36. The low voltage loads 34 may be electrically coupled to the auxiliary battery 36 via the low voltage bus 32. One or more high voltage electrical loads 38 may be coupled to the high voltage bus 26. The high voltage electrical loads 38 may have an associated controller that operates and controls the high voltage electrical loads 38 when appropriate. Examples of high voltage electrical loads 38 include a fan, an electric heating element, an air conditioning compressor, etc.

Wheel brakes 40 may be also provided for braking and preventing motion of the vehicle 10. The wheel brakes 40 may be hydraulically actuated, electrically actuated, or some combination thereof. The wheel brakes 40 may be a part of a brake system 42. The brake system 42 may include other components to operate the wheel brakes 40. For simplicity, FIG. 1 depicts a single connection between the brake system 42 and one of the wheel brakes 40. A connection between the brake system 42 and the other wheel brakes 40 is implied. The brake system 42 may include a controller to monitor and coordinate its activities. The brake system 42 may monitor the brake components and control the wheel brakes 40. The brake system 42 may respond to driver commands and may also operate autonomously to implement features such as stability control. The controller of the brake system 42 may implement a method of applying a requested brake force when requested by another controller or sub-function.

Figure 2:
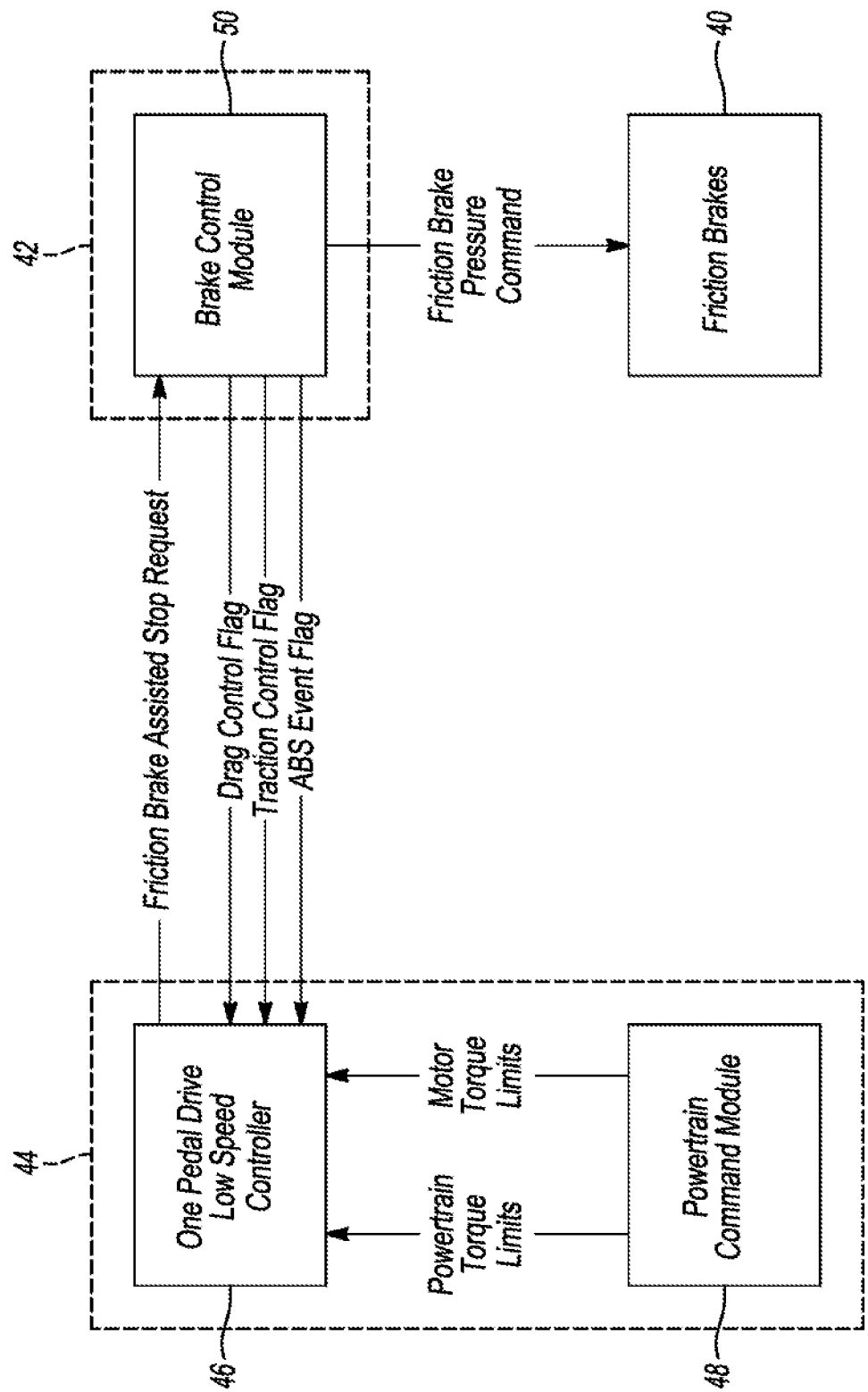
FIG. 2 is a block diagram of a portion of the vehicle of FIG. 1

System controllers 44 may further be present to coordinate the operation of the various components. With reference to FIG. 2, the system controllers 44 include a one pedal drive low speed controller 46 and a powertrain command module 48. The powertrain command module issues powertrain torque limits and motor torque limits, which are received by the one pedal drive low speed controller 46. These limits may be defined by powertrain components temperatures and other factors as known in the art. The brake system 42 includes a brake control module 50 that sets flags corresponding to events such as drag control, traction control, antilock braking events, etc. These flags are detected by the one pedal drive low speed controller 46, which generates a friction brake assisted stop request according to the algorithms contemplated herein. Responsive to receiving the frication brake assisted stop request, the brake control module 50 generates a friction brake pressure command for the friction brakes 40.

Electronic modules in the vehicle 10, such as those shown in FIGS. 1 and 2, may communicate via one or more vehicle networks. The vehicle networks may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 36. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10.

Figure 3:
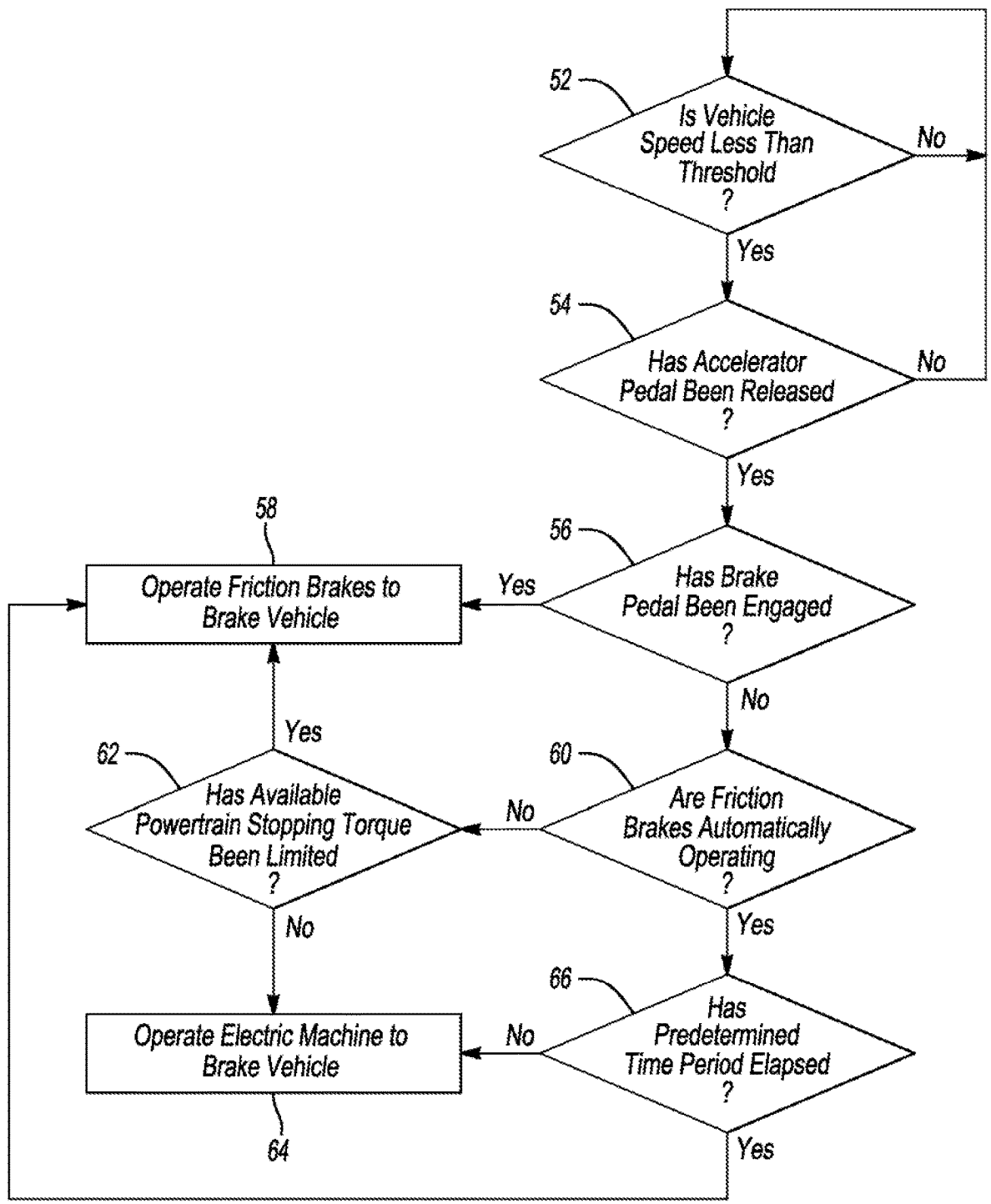
FIG. 3 is a flow chart of an algorithm for one pedal drive low speed control.

With reference to FIG. 3, at operation 52 it is determined whether vehicle speed is less than a threshold. If no, the algorithm returns to operation 52. If yes, it is determined at operation 54 whether the accelerator pedal has been released at operation 54. If no, the algorithm returns to operation 52. If yes, at operation 56 it is determined whether the brake pedal has been engaged. If yes, the friction brakes are operated to brake the vehicle to a stop at operation 58. If no, it is determined at operation 60 whether the friction brakes are automatically operating. If no, at operation 62 it is determined whether available powertrain stopping torque has been limited. A battery state of charge greater than a threshold (e.g., 85%) or an electric machine temperature greater than a threshold, for example, may result in limits on available powertrain stopping torque. Thus, battery voltage, electric machine temperature, etc. may be compared against corresponding thresholds to determine whether available powertrain stopping torque has been limited. If yes, the algorithm proceeds to operation 58. If no, the electric machine is operated to brake the vehicle at operation 64. Returning to operation 60, if yes, it is determined at operation 66 whether a predetermined time period has elapsed. If yes, the algorithm proceeds to operation 58. If no, the algorithm proceeds to operation 64.

Aside from friction brakes automatically operating, other conditions may also be considered at operation 60. Indication that available powertrain torque has been reduced can also be considered. As suggested with reference to FIG. 2, flags are often broadcast/set during brake drag control and traction control events. Determination as to whether such flags are present using typical techniques can thus be used to assess whether available powertrain torque has been reduced. Moreover, the predetermined time period of operation 66 may depend on the cause of the indication that available powertrain torque has been reduced: Brake drag control may correspond to a first predetermined period of time and traction control may correspond to a second predetermined period of time different than the first, etc. Moreover, data from typical sensors (e.g., wheels speed sensors, accelerator pedal position sensor, brake pedal sensor, battery voltage sensors, etc.) may be used to collect the data necessary to make the determinations described above.

Control logic or functions performed by the controllers are represented by flow charts or similar diagrams in the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle comprising:
   by a controller,
      responsive to, during one pedal drive mode, accelerator pedal release in a presence of indication that available powertrain torque has been reduced for at least a predetermined period of time during an absence of brake pedal engagement, operating friction brakes to bring the vehicle to a stop, wherein the predetermined period of time depends on a cause of the indication that available powertrain torque has been reduced such that the predetermined period of time is different for different causes of the indication, and
      responsive to, during the one pedal drive mode, accelerator pedal release in an absence of the (i) indication that available powertrain torque has been reduced and (ii) brake pedal engagement, operating an electric machine and not the friction brakes to bring the vehicle to a stop.

2. The method of claim 1 further comprising, responsive to, during the one pedal drive mode, accelerator pedal release, the absence of the (i) indication that available powertrain torque has been reduced and (ii) brake pedal engagement, and a battery state of charge exceeding a state of charge threshold, operating the friction brakes to bring the vehicle to a stop.

3. The method of claim 1 further comprising, responsive to, during the one pedal drive mode, accelerator pedal release, the absence of the (i) indication that available powertrain torque has been reduced and (ii) brake pedal engagement, and a state of the electric machine, operating the friction brakes to bring the vehicle to a stop.

4. The method of claim 3, wherein the state of the electric machine is a temperature of the electric machine.

5. The method of claim 1, wherein the cause is a traction control event.

6. The method of claim 5, wherein the cause is a brake drag control event.

\* \* \* \* \*